United States Patent
Lemke et al.

(10) Patent No.: US 10,471,530 B2
(45) Date of Patent: *Nov. 12, 2019

(54) BRAZED COMPONENT AND METHOD OF FORMING A BRAZED JOINT THEREIN

(71) Applicant: GKN Sinter Metals, LLC, Auburn Hills, MI (US)

(72) Inventors: Jeffrey W. Lemke, St. Thomas (CA); Ian W. Donaldson, Jefferson, MA (US); John D. Gurosik, Kersey, PA (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 853 days.

This patent is subject to a terminal disclaimer.

(21) Appl. No.: 14/275,106

(22) Filed: May 12, 2014

(65) Prior Publication Data

US 2014/0341635 A1    Nov. 20, 2014

Related U.S. Application Data

(63) Continuation of application No. 12/918,118, filed as application No. PCT/US2009/034697 on Feb. 20, 2009, now Pat. No. 8,753,753.

(60) Provisional application No. 61/066,804, filed on Feb. 22, 2008, provisional application No. 61/101,457, filed on Sep. 30, 2008.

(51) Int. Cl.
  *B23K 1/00* (2006.01)
  *B23K 33/00* (2006.01)
  *B23K 1/20* (2006.01)

(52) U.S. Cl.
  CPC ............ *B23K 1/0008* (2013.01); *B23K 1/20* (2013.01); *B23K 33/00* (2013.01); *Y10T 403/1624* (2015.01); *Y10T 428/1241* (2015.01); *Y10T 428/12389* (2015.01)

(58) Field of Classification Search
  None
  See application file for complete search history.

(56) References Cited

U.S. PATENT DOCUMENTS

| 3,324,544 A | 6/1967 | Haller |
| 3,479,731 A | 11/1969 | Mantel et al. |
| (Continued) | | |

FOREIGN PATENT DOCUMENTS

| CN | 1548266 A | 11/2004 |
| JP | S55-115731 U | 2/1954 |
| (Continued) | | |

OTHER PUBLICATIONS

The State Intellectual Property Office of the People's Republic of China, First Office Action and Search Report with translation, Application No. 201310190419.3, dated Dec. 23, 2014, 15 pages.

(Continued)

*Primary Examiner* — Adam Krupicka
(74) *Attorney, Agent, or Firm* — Quarles & Brady LLP

(57) ABSTRACT

A brazed part includes two or more components that are brazed together and has related method of making. Using a method of locating parts relative to one another, an inter-component gap between the components may be formed. Subsequently, during brazing, flow control features formed along the inter-component gap may then be used to assist in the retention of the braze material between the components during brazing.

15 Claims, 9 Drawing Sheets

(56) References Cited

U.S. PATENT DOCUMENTS

| | | | |
|---|---|---|---|
| 4,449,027 | A | 5/1984 | Fujikawa |
| 4,541,282 | A | 9/1985 | Auerweck et al. |
| 4,942,999 | A | 7/1990 | Oda et al. |
| 4,962,002 | A | 10/1990 | Yoshida et al. |
| 6,902,825 | B2 | 6/2005 | Yano et al. |
| 2004/0013897 | A1 | 1/2004 | Yano et al. |
| 2006/0275607 | A1 | 12/2006 | Demir et al. |

FOREIGN PATENT DOCUMENTS

| | | | |
|---|---|---|---|
| JP | S61-14074 | A | 1/1986 |
| JP | 01219072 | A | 9/1989 |
| JP | H04300070 | A | 10/1992 |
| JP | H08011075 | A | 1/1996 |
| JP | 2002079372 | A | 3/2002 |
| JP | 2003251457 | A | 9/2003 |
| JP | 2003251458 | A | 9/2003 |
| JP | 2004304930 | A | 10/2004 |
| JP | 2006326616 | A | 12/2006 |

OTHER PUBLICATIONS

The State Intellectual Property Office of the People's Republic of China, Notice on Reexamination with translation, Application No. 200980113410.4, dated Apr. 16, 2015, 19 pages.

Japanese Patent Office, Notification of Reason for Refusal with translation, Application No. 2014-6468, dated May 26, 2015, 7 pages.

The State Intellectual Property Office of the People's Republic of China, Notice on the Second Office Action with translation, Application No. 201310190419.3, dated Jul. 21, 2015, 15 pages.

European Patent Office, Communication, Application No. 09 712 243.6, dated Jul. 28, 2015, 5 pages.

Japanese Patent Office, Decision on Refusal with translation, Application No. 2014-6468, dated Sep. 8, 2015, 10 pages.

The State Intellectual Property Office of the People's Republic of China, Notice on Reexamination with translation, Application No. 200980113410.4, dated Dec. 7, 2015, 7 pages.

The State Intellectual Property Office of the People's Republic of China, Third Office Action and Search Report, Application No. 201310190419.3, dated Jan. 29, 2016.

Japan Patent Office, Notification of Reason for Refusal, Application No. 2014-079083, dated Mar. 17, 2015, 8 pages.

PCT International Search Report and Written Opinion, PCT/US2009/034697, dated Apr. 21, 2009, 7 pages.

Japanese Patent Office, Notification of Rejection Reasons, Application No. 2010-547796, dated May 28, 2013, 5 pages.

Japanese Patent Office, Decision of Refusal, Application No. 2010-547796, dated Dec. 10, 2013, 5 pages.

The State Intellectual Property Office of the People's Republic of China, First Office Action and Search Report, Application No. 200980113410.4, dated Nov. 29, 2012, 16 pages.

The State Intellectual Property Office of the People's Republic of China, Second Office Action and Search Report, Application No. 200980113410.4, dated Jul. 16, 2013, 21 pages.

The State Intellectual Property Office of the People's Republic of China, Decision on Rejection, Application No. 200980113410.4, dated Jan. 8, 2014, 21 pages.

Intellectual Property India—The Patent Office, Examination Report, Application No. 3055/KOLNP/2010, dated Dec. 1, 2017.

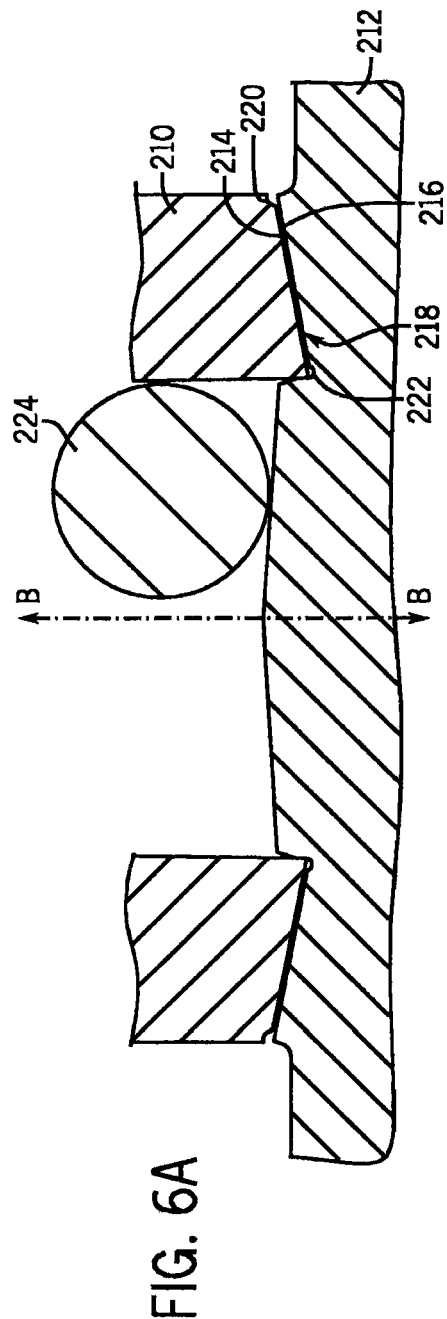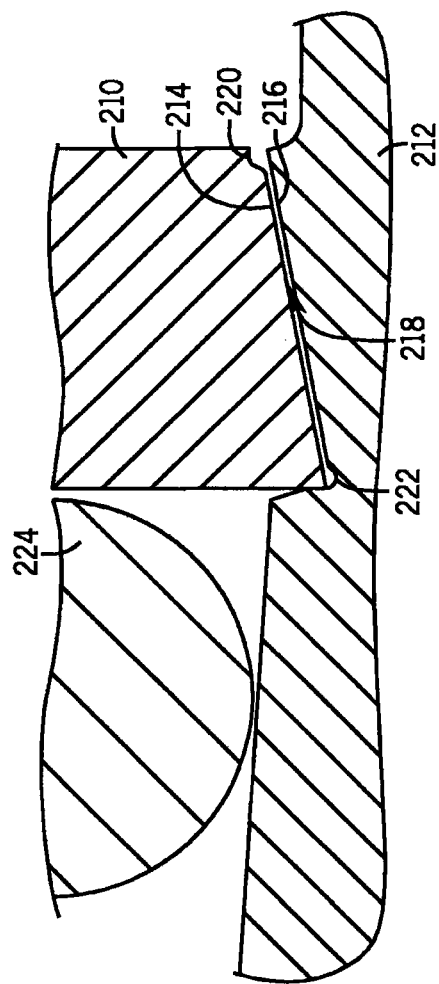
FIG. 6A
FIG. 6B

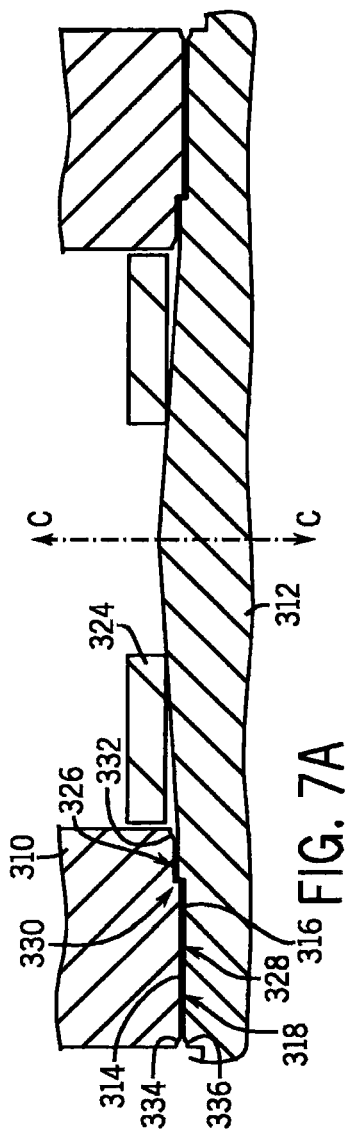
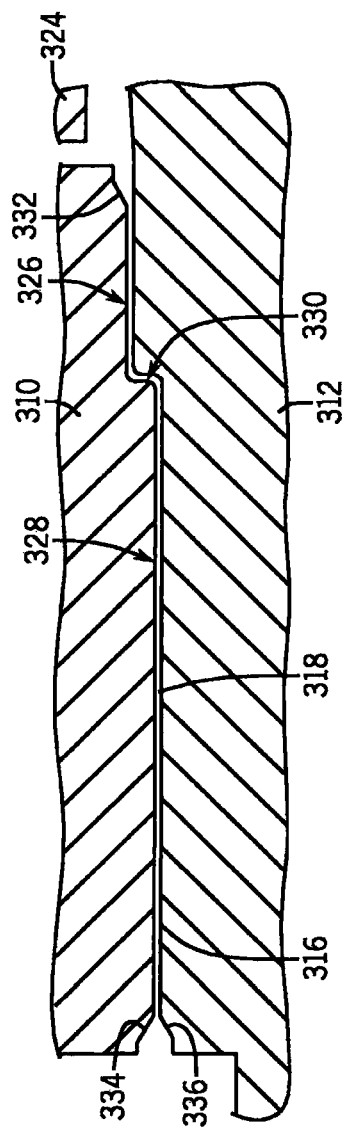

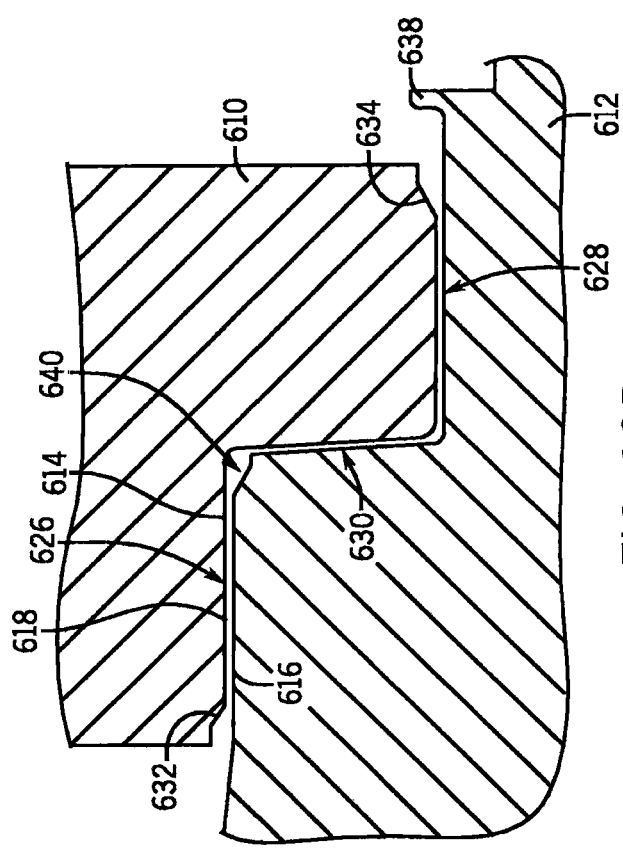

BRAZED COMPONENT AND METHOD OF FORMING A BRAZED JOINT THEREIN

CROSS-REFERENCE TO RELATED APPLICATIONS

This application is a continuation application of U.S. non-provisional patent application Ser. No. 12/918,118 filed Nov. 24, 2010 which represents the national stage of PCT International Application No. PCT/US2009/034697 filed Feb. 20, 2009, which claims the benefit of U.S. Provisional Application No. 61/066,804 entitled "Locating Joint and Method of Locating" filed on Feb. 22, 2008, and U.S. Provisional Application No. 61/101,457 entitled "Braze Flow Control" filed on Sep. 30, 2008, the contents of all of which are incorporated herein by reference in their entirety for all purposes.

STATEMENT OF FEDERALLY SPONSORED RESEARCH OR DEVELOPMENT

Not applicable.

BACKGROUND OF THE INVENTION

This disclosure relates to the brazing of two or more components. In particular, this disclosure relates to component structures for controlling the flow of brazing material between the components and methods related to forming and using said structures to provide stronger brazements between the components.

Brazing is a process by which two or more metallic components may be joined to one another. The brazing process often begins with a solid brazing material being placed in a reservoir that is in fluid communication with a volume between the surfaces of the components to be joined. The brazing material has a low melting temperature such that, when the brazing material is heated, the brazing material forms a liquid phase that fills the volume between the two components. Typically, gravity and capillary action are used to transport the liquid phase of the brazing material from the reservoir to the volume between the two components.

The liquid phase of the brazing material contacts and wets the surfaces of each of the components. This contact between the liquid phase of the brazing material and the metallic surfaces to be joined dissolves a thin layer of each of the metallic surfaces. The liquid phase of the brazing material and the dissolved component metals form a liquid alloy. Upon solidification, the liquid alloy forms a bond between the components, thus joining them.

The strength of the brazed joint may be compromised if the brazing surfaces are not properly wetted by the brazing material. Improper wetting may occur if the distance between the surfaces to be brazed is irregular or if there is not enough brazing material to fill the gap between the components. If the brazing material does not completely fill the gap between the components, then this defect weakens the brazed joint and makes it more susceptible to mechanical failure.

As the assembled, but not yet brazed, components are typically handled before brazing, some misalignment of the components is common. Such misalignment can alter the uniformity and the consistency of the spacing of the components, adversely affecting the wetting of the surfaces during brazing and creating the potential for loss of some of the brazing material via overflow.

Further, if mishandling has severely misaligned the components, then the overall dimensional requirements for the final brazed part may not be met, meaning that the part will need to be scrapped or subjected to costly post-brazing secondary operations.

Hence, a need exists for improvements in the brazing process to provide mechanically strong brazed joints. In particular, there is a need for better control over the brazing material during the formation of the brazed joint.

SUMMARY OF THE INVENTION

A brazed part is disclosed including a first component and a second component. The components are brazed together along an inter-component gap between their respective brazing surfaces by a brazing material. The brazed part includes a plurality of locating joints defining the inter-component gap between the brazing surfaces. Each of the locating joints includes a projection with an arcuate convex surface on one of the components and a corresponding recess with opposite-facing angled walls on the other of the components. In each of the locating joints, the projection is located in the corresponding recess and is supported by contact between the arcuate convex surface and at least one of the angled walls. During brazing, the brazing material is heated to form a liquid that flows through the inter-component gap to wet the brazing surfaces and join them upon solidification.

In one form, the brazed part may further include a flow control feature formed on at least one of the first component and the second component. The flow control feature is formed proximate a periphery of the inter-component gap. The flow control feature may be a lip that increases a distance of the inter-component gap between the first component and the second component. The lip may inhibit a capillary action of the brazing material past the periphery of the inter-component gap during the brazing process. The flow control feature may also be a dam that is vertically raised from the brazing surface of at least one of the first component and the second component. The dam inhibits the flow of the brazing material past the dam to substantially retain the brazing material within the inter-component gap.

In another form, the brazed part may further include a flow control feature formed between a first section and second section of the inter-component gap, the first section and second section not being in the same plane. The flow control feature may be a lip that reduces a capillary force of the brazing material proximate to the lip to inhibit the flow of the brazing material from the first section to the second section of the inter-component gap during a brazing process. In this way, when the brazed part is subjected to a rotational stress about an axis resulting in an applied shear stress between the first and section components, at least one the first section and second section extend along an essentially axial direction to increase an area over which the shear stress is applied.

In yet another form, the brazed part may be a planetary gear carrier. In this form, the first component is a cage having at least three legs, each of the legs having one of a projection with an arcuate convex surface and a recess with opposite-facing angled walls. The second component is a plate having three locating joint halves, each of the locating joint halves being one of a projection with an arcuate convex surface and a recess with opposite-facing angled walls and mating with the locating joint half on one of the at least three legs to define three locating joints and the inter-component gap between the cage and the plate.

In still yet another form, the arcuate convex surface is semi-spherical and each of the angled walls contacted by the arcuate convex surface are essentially planar.

A method of locating two or more components relative to one another is also disclosed. The method includes providing a first component and a second component. Each component has a plurality of locating joint portions, each of the locating joint portions being one of a projection with an arcuate convex surface and a recess with opposite-facing angled walls. The method further includes locating the first component relative to the second component by mating the plurality of locating joint portions of the first component with the plurality of locating joint portions of the second component to form a plurality of locating joints. Each of the plurality of locating joints includes a projection and a recess such that the arcuate convex surface of the projection contacts at least one of the opposite-facing angled walls of the recess.

In one form, the step of locating the first component relative to the second component may include forming at least three locating joints that define an inter-component gap between the first component and the second component.

In this form, the method may further include the steps of applying a brazing material to at least one of the first component and the second component and brazing the first component and the second component together along the inter-component gap using the brazing material.

The step of applying the brazing material may include placing the brazing material in a blind hole. Alternatively or in combination, the step of applying the brazing material may include placing the brazing material in the recess of the locating joint. In either form, the step of brazing the first component and the second component together includes melting the brazing material such that the brazing material moves to and wets at least a portion of the inter-component gap between the first component and the second component by capillary action.

The step of applying the brazing material to at least one of the first component and the second component may occur before locating the first component relative to the second component. In this form, during the brazing step, as the brazing material melts, a distance between the first component and the second component decreases and locates the first component relative to the second component by self-seating the locating joint portions of the first component in the locating joint portions of the second component to form the locating joints.

A method of controlling a flow of a brazing material during a brazing process is also disclosed. The method includes providing a first component and a second component. The first component and the second component each have a brazing surface. At least one of the first component and the second component have a flow control feature formed thereon. The method further includes locating the first component relative to the second component such that the brazing surface of the first component and the brazing surface of the second component have an inter-component gap therebetween. The method further includes providing a brazing material and heating the brazing material to at least a melting point of the brazing material to form a liquid that flows through the inter-component gap by wetting the brazing surfaces of the first component and the second component. The flow control feature substantially retains the brazing material within the inter-component gap to form a brazed joint between the first component and the second component.

In one form of the method, the first component and the second component each may have at least three locating joint portions. Each of the at least three locating joint portions are one of a projection with an arcuate convex surface and a recess with opposite-facing angled walls. In this form, the step of locating the first component relative to the second component includes mating at least three locating joint portions of the first component and at least three locating joint portions of the second component to form at least three locating joints that define the inter-component gap. Each of the at least three locating joints include a projection and a recess, such that the arcuate convex surface of the projection contacts at least one of the opposite-facing angled walls of the recess.

In another form of the method, the flow control feature may be a dam formed proximate a periphery of the inter-component gap. The dam is a portion that is vertically raised such that, during the heating of the brazing material, the flow of the brazing material past the dam is inhibited.

In yet another form of the invention, the flow control feature may be a lip formed proximate a periphery of the inter-component gap. The lip is a portion that increases a distance of the inter-component gap proximate the periphery of the inter-component gap to inhibit the capillary action of the brazing material past the periphery of the inter-component gap during brazing.

In still yet another form, the flow control feature may be formed between two sections of the inter-component gap that are not in the same plane as one another and the flow control feature reduces a capillary force of the braze material proximate the flow control feature to reduce the flow of material from one of the two sections to the other. The two sections may include an essentially horizontal first section along a plane and a second section that is at an angle to the essentially horizontal section. In that form, the flow control feature is a lip that increases the inter-component gap along an intersection between the first section and the second section.

Another brazed part is also disclosed having a first component and a second component with a brazing material located in an inter-component gap therebetween. The brazing material joins a brazing surface of the first component and a brazing surface of the second component together at a brazed joint. The brazed joint is formed during a brazing process in which the brazing material melts to flow across the inter-component gap and then solidify to form the brazed joint. The brazed part includes a flow control feature formed on at least one of the first component and the second component. The flow control feature substantially retains the brazing material within the inter-component gap.

In one form of the brazed part, there may be at least three locating joint portions formed in each of the first component and the second component. Each of the locating joint portions are one of a projection with an arcuate convex surface and a recess with opposite-facing angled walls. The locating joint portions of the first component and the at least three locating joint portions of the second component mating to form at least three locating joints that define the inter-component gap. Each of the locating joints including a projection and a recess, such that the arcuate convex surface of the projection contacts at least one of the opposite-facing angled walls of the recess.

In another form, the flow control feature may be a lip that locally increases the inter-component gap between the first component and second component. The lip may inhibit a capillary action of the brazing material during the brazing process.

In yet another form, the flow control feature may be a dam that is vertically raised from the brazing surface of at least one of the first component and the second component. The dam inhibits the flow of the brazing material from the inter-component gap past the dam.

In still another form, the inter-component gap may include an outer periphery and an inner periphery each having a flow control feature formed thereon.

In still yet another form, the flow control feature may be a lip formed between two sections of the inter-component gap that are not in the same plane as one another. The lip reduces a capillary force of the braze material proximate the flow control feature to reduce the flow of material from one of the two sections to the other.

In still yet another form, the flow control feature may be configured to stop the progression of a meniscus of the brazed material in liquid form past the flow control feature during the brazing process by locally increasing the inter-component gap Thus, a brazed part and methods related to forming a brazed part are provided that solve many of the aforementioned problems associated with brazing. Using the structures and methods described herein, it is possible to locate two or more components relative to one another in a manner that provides a uniform and consistent gap between the surfaces. As the joints are self-locating, some mishandling of the parts will not upset the positioning of the parts relative to one another. This minimizes the likelihood of the gap increasing to the point at which capillary action of the brazing material is insufficient to entirely fill the gap, potentially resulting in the localized overflow of the brazing material while in liquid form. Further, the flow control features and method of controlling the flow of the brazing material help to retain all of the brazing material in the gap and allow for brazements having complex geometries that would be otherwise difficult, if not impossible, to achieve without such use of such flow control features.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIG. 6A is a cross-sectional side view of two components arranged next to one another prior to brazing in which each of the components having a flow control feature;

FIG. 6B is a detailed cross-sectional side view of FIG. 6A;

FIG. 7A is a cross-sectional side view of two components having lips formed about the peripheries of an inter-component gap and having a step formed in the inter-component gap, the two components being positioned next to one another prior to brazing;

FIG. 7B is a detailed cross-sectional side view of FIG. 7A;

FIG. 10B is a detailed cross-sectional side view of FIG. 10A.

DETAILED DESCRIPTION OF THE PREFERRED EMBODIMENTS

Figure 1:
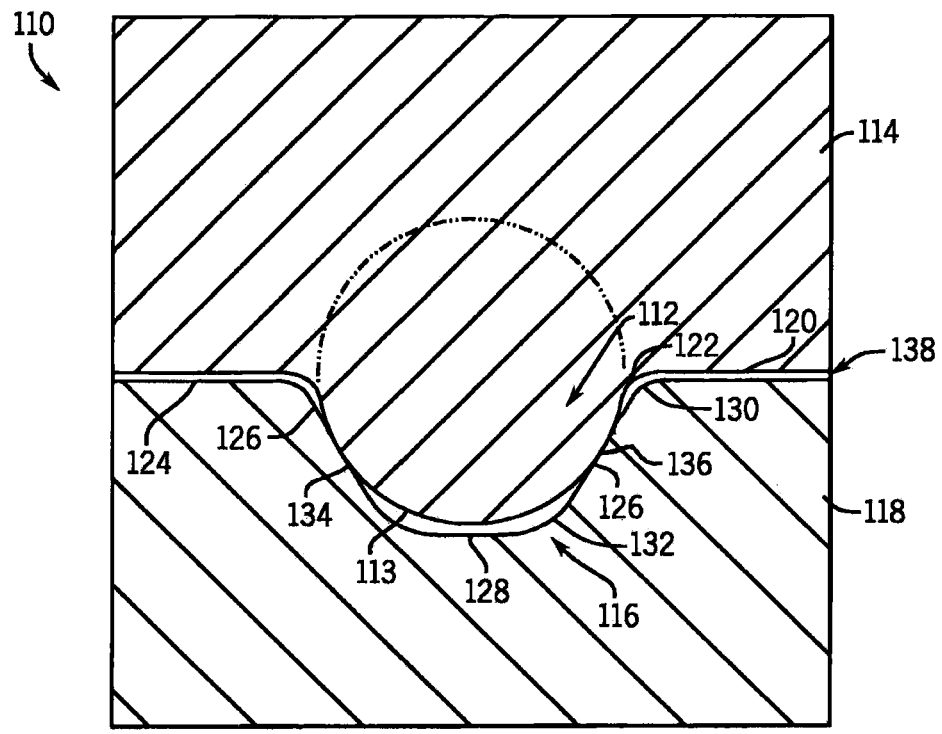
FIG. 1 is a cross-sectional side view of a locating joint.

Referring now to FIG. 1, a locating joint 110 is shown. The locating joint 110 includes a projection 112 having an arcuate convex surface 113 on a first component 114 and a recess 116 on a second component 118.

Figure 2:
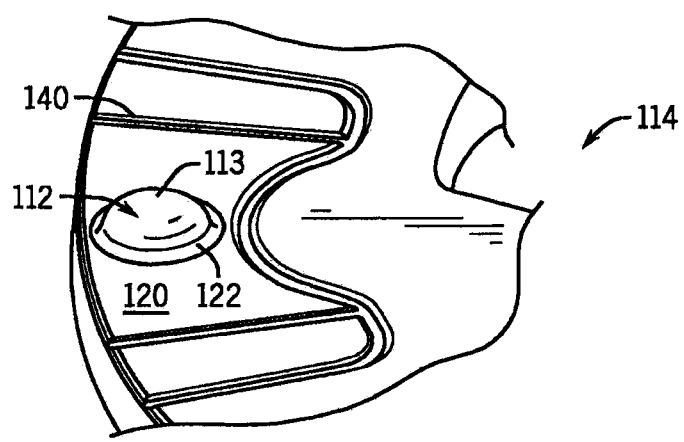
FIG. 2 is a perspective view of one half of the locating joint including a projection.

Referring now to FIGS. 1 and 2, the projection 112 extends from a surface 120 of the first component 114 and may include a transitioning radius 122 between the surface 120 and the arcuate convex surface 113. It should be appreciated that the arcuate convex surface 113 may have other surface geometries including, but not limited to, a semi-spherical surface having a constant radius. The projection 112 may be referred to as the male mating component or by other similar terms.

Figure 3:
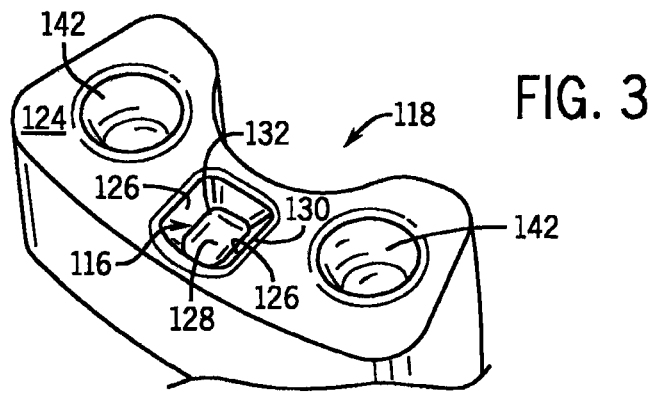
FIG. 3 is a perspective view of the other half of the locating joint including a recess with oppositely-facing angled walls.

Referring now to FIGS. 1 and 3, the recess 116 extends into a surface 124 of the second component 118 and includes opposite-facing angled walls 126 extending down to a bottom 128 of the recess 116. Like the projection 112, the recess 116 may have transitioning radii 130 and 132 between the surface 124, the angled walls 126, and the bottom 128. As shown, the opposite-facing angled walls 126 are flat, planar surfaces. The recess 116 extends further in a direction parallel to the opposite-facing angled walls 126 than in the direction perpendicular to the opposite-facing angled walls 126. The recess 116 might be generally described as a rounded rectangular-shaped recess that generally tapers inward as the recess 116 extends downward to the bottom 128. The recess 116 may be referred to as the female mating component or by other similar terms. Generically, the projection 112 and the recess 116 may each be referred to as a locating joint half.

During the formation of the locating joint 110, the arcuate convex surface 113 contacts the opposite-facing angled walls 126 of the recess 116 at one or both of contact points 134 and 136. Given the geometry of the arcuate convex surface 113 and the opposite-facing angled walls 126, the projection 112 only tangentially touches the recess 116 at one or both of the two contact points 134 and 136.

Although two contact points 134 and 136 are shown in FIG. 1, it is possible that the arcuate convex surface 113 may only tangentially contact one of the opposite-facing angled walls 126. As will be described in further detail below, there may only be a single point of contact if one of the first component 114 and second component 118 are restricted at a location outside of the cross-section shown in FIG. 1.

Given the surface geometries of the projection 112 and the recess 116, an inter-component gap 138 is created between the surface 120 of the first component 114 and the surface 124 of the second component 118 when the projection 112 and recess 116 mate. By altering the geometry of the arcuate convex surface 113 of the projection 112, the width of the recess 116, or the pitch of the opposite-facing angled walls 126 of the recess 116, the contact points 134 and 136 can be modified such that the gap 138 can be controlled. It should be noted that while the gap 138 is constant and uniform as shown, that the nature of this gap 138 is at least in part due to features outside of the cross-sectional view of FIG. 1 as will be described in further detail below.

FIGS. 1-3 have been used to show the structure of one form of a single locating joint. It is contemplated that multiple locating joints could be incorporated into a single assembly including two or more components to define points of contact between the components and, thus, the inter-component gap between the components.

For example, in FIGS. 2-5, a planetary gear carrier is shown that includes three locating joints between a plate and a cage having three legs. Thus, the projection 112 shown on the surface 120 of the plate in FIG. 2 is a single representative of the three projections found on the plate. Likewise, the recess 116 shown on the surface 124 of the leg in FIG. 3 is representative of the recess found on each of the three legs of the cage.

For ease of reference, the numbers used in FIGS. 2 and 3 to describe the features of one of the joints will be used generically to refer to similar features in the planetary gear carrier (e.g., the reference number 116 in FIG. 3 that refers to a single recess on the component will be used refer to the recesses found on each of the legs).

Figure 4:
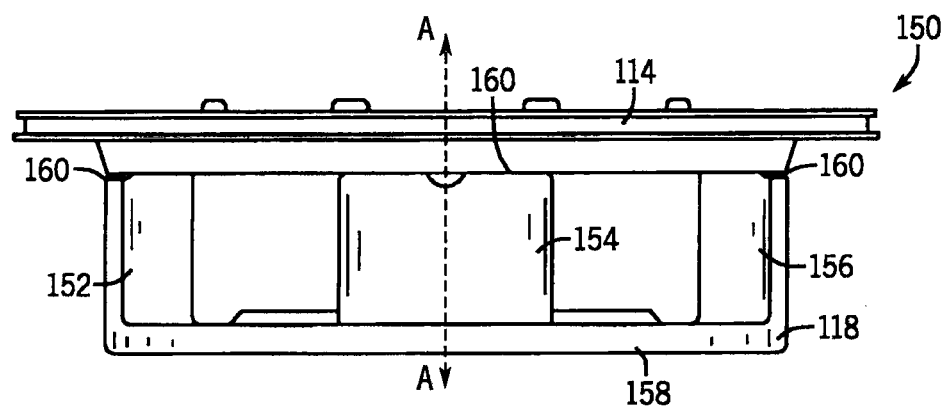
FIG. 4 is a side elevation view of a planetary gear carrier.
Figure 5:
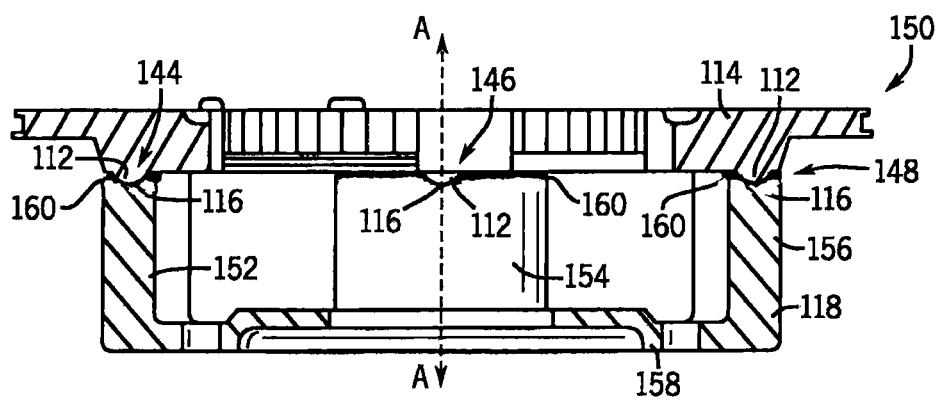
FIG. 5 is a cross-sectional view of the planetary gear carrier.

Referring now to FIGS. 4 and 5, the first component 114 is located with respect to the second component 118 at three locating joints 144, 146, and 148, which are all similar to the locating joint 110, to form a planetary gear carrier 150. As shown, the first component 114 is a plate and the second component 118 is a "cage" or "spider" having three legs 152, 154, and 156 connected at a base 158. The first component 114 or plate has three projections 112, each similar to the projection 112 shown in FIG. 2. Likewise, each of the three legs 152, 154, and 156 has a recess 116 similar to the recess 116 shown in FIG. 3. The three projections 112 on the plate are placed into the three recesses 116 of the legs 152, 154, and 156 forming the three locating joints 144, 146, and 148.

Although an overhead view is not shown of the planetary gear carrier 150, the planetary gear carrier 150 is roughly circular in a top plan view, and the center of the legs 152, 154, and 156 (and the recesses contained thereon) are all spaced 120 degrees apart about an axis A which runs vertically through the center of the planetary gear carrier 150. In this form, it is preferable if the opposite-facing angled walls 126, for contacting the arcuate convex surfaces 113, generally extend in a direction towards the axis A. However, not all of the contacting walls need extend in a direction towards a central point or axis. Similarly, the centers of the projections 112 are also spaced 120 degrees apart about the axis A on the plate.

Thus, when the projections 112 are received into the recesses 116, the locating joints 144, 146, and 148 align the centers of the projections 112 into centers of the recesses 116 and simultaneously radially align the first component 114 and the second component 118 about the axis A. Ideally, each of the arcuate convex surfaces 113 of the projections 112 make a point of contact with the each of the opposite-facing angled walls 126 (thus providing two points of contact per locating joint). However, it is contemplated that more than likely a "best fit" situation will occur if any of the projections 112 or recesses 116 deviate too far from their target location on the components 114 and 118. Thus, in most situations, only one point of contact will exist in a given locating joint.

This alignment of the first component 114 relative to the second component 118 by the locating joints 144, 146, and 148 provides many benefits.

The locating joints 144, 146, and 148 reduce the likelihood of misassembly during handling. In particular, the steep pilot angle of the angled walls 126 and the depth of engagement of the projection 112 into the recess 116 prevent the unintended shifting of the first component 114 relative to the second component 118.

Additionally, these three locating joints 144, 146, and 148 provide points of contact that define the gap 138 between each of the surfaces 124 of the legs 152, 154, and 156 of the cage and the surface 120 of the plate. Assuming that each of the locating joints 144, 146, and 148 have a projection 112 mating with the recess 116 in a relatively similar way, the gap 138 will be uniform and consistent between the surfaces 124 of each of the legs and surface 120 of the plate.

Although such a gap is not necessarily formed (depending on the geometry of the locating joint halves), the formation of the gap 138 is beneficial if the two components are to be brazed together. According to one aspect of the invention, the first component 114 and the second component 118 may be brazed together after locating the first component 114 and the second component 118 with respect to one another. The gap 138 may provide a controlled "channel" having relatively uniform spacing between the surfaces 120 and 124 for promoting the capillary action of a liquid phase of a brazing material between the surfaces 120 and 124.

From FIGS. 2 and 3, it can be seen that the first component 114 has a network of channels 140 that run along the surface 120 of the first component 114. The outer edge of the network of channels 140 roughly matches the outer profile of the legs of the second component 118. The second component 118 also has blind holes 142 for capturing pellets of brazing material (not shown).

When the first and second components 114 and 118 are located using the locating joints 144, 146 and 148, and heated to a temperature above the melting temperature of the brazing material, the brazing material melts out of the blind holes 142. Preferably, during brazing, the orientation of the blind holes 142 face downward such that the brazing material may run out of the blind holes 142. By gravity and capillary action, the brazing material fills the gap 138 between the first component 114 and the second component 118. The network of channels 140 captures and prevents the brazing material from flowing past the outer edge of the network of channels 140 and onto other surfaces of the components. In this way, the brazing material can flow into the controlled gap between the surfaces 120 and 124 of each of the legs and the plate. As will be described in more detail below, there may be additional flow control features that restrict the flow patterns of the brazing material.

The brazing material is selected such that when it contacts the surfaces 120 and 124, the chemistry at the surface permits the formation of a liquid alloy between the brazing material and each of the components. Upon cooling, this liquid alloy containing both the brazing material and the component material forms a solid layer 160 that bonds the two components together.

The planetary gear carrier 150 shown in FIGS. 2-5 would typically be brazed using a sinter brazing process as one or both of the cage and plate may be a powder metal part. However, there is nothing requiring that one of the components be made of powder metal. Thus, it is also contemplated that both of the components could be fully dense materials.

Although a method of brazing has been shown in which the brazing material flows out of blind holes 142, other brazing techniques may be used. For example, the brazing compound may be a flat, stamped sheet placed over the surface of one of the components. Likewise, pastes including brazing compounds could be applied to one or more of the components before the brazing process occurs.

Although FIGS. 1-5 show locating joints in which the projections 112 contact the recesses 116 prior to the brazing process, it is contemplated that a brazing compound might be added between the surfaces 120 and 124 such that the projections 112 do not initially contact the recesses 116. In this case, upon melting, at least a portion of the brazing material would be sandwiched out of the gap between the components or absorbed by the components (as may be the case in a porous powder metal component), moving the components together as the locating joints self-seat. Thus, the locating joints may perform the locating function as the brazing process occurs.

Likewise, brazing material may be added to the bottom 128 of the recesses 116 such that the projections 112 and the recesses 116 do not initially contact one another. However, during the brazing process, the projections 112 and the recesses 116 may self-seat as the brazing material flows from the recesses 116. If the brazing material is placed in the recesses 116, then it may be preferable to have the recesses 116 located above the projections 112, such that gravity aids the flow of the brazing material out of the locating joint and into the gaps 138.

Further, the recesses 116 and the blind holes 142 may be through-holes such that brazing material may be introduced after the projections 112 and recesses 116 have already formed points of contact.

Additionally, although the embodiment shown in FIGS. 2-5 employs a method including brazing two components together, the locating joint 110 could be used in any one of a number of other joining methods. For example, the locating feature may be applied to other joining methods such as, for example, riveting, welding, staking, providing central and radial locating for fasteners such as bolts and the like. Moreover, the locating joint 110 may be of use in applications requiring the locating, but not necessarily the joining, of two or more components.

It should be further appreciated that although only two components have been shown to be located using the locating method and locating joints 110, that more than two components may be joined using the method and locating joints described herein. For example, more than two components may be stacked into a multi-component assembly.

Further, although three locating joints have been shown in the embodiment shown in FIGS. 2-5, less or more than three locating joints may be suitable for locating components relative to one another. For example, two locating joints 110 may be used to locate two items about a line. In this case, the angled walls of the recess in one of the locating joints would not be parallel with the angled walls of the recess in the other locating joint. In yet another example, more than three locating joints may be made available. In this case, only three of the more than three locating joints form points of contact and other, out-of-plane locator and redundant joint halves, would not contact one another.

Moreover, when multiple locating joints are used, it is contemplated a single component may have more than one type of locating joint half (i.e., projection or recess). For example, a first component may have two projections and a single recess. In this case, by necessity the second component would need to have two recesses and a single projection, properly positioned, to mate with the first component.

The above-disclosed locating joints help to provide a consistent and uniform gap between multiple components that facilitates improved capillary action of a braze material between the components to provide a mechanically strong brazed joint. Disclosed below are further structures and methods for retaining the braze material within the gap between the components such that, during brazing, little or no braze material escapes the inter-component gap. These embodiments may be used with or without the locating joints, but for the above-mentioned reasons, the combination of the above-described locating joints with the below-described flow control features will typically provide the most advantageous results.

Referring now to FIGS. 6A and 6B, a first component 210 is shown placed on top of a second component 212 prior to a brazing operation. In one form, and as shown, the first component 210 may be a cylindrical hub and the second component 212 may be a scroll flange. The first component 210 and the second component 212 share a central axis B-B. These components may be powder metal components or formed using other common metal forming techniques.

The first component 210 has a brazing surface 214 and the second component 212 has a brazing surface 216. The first component 210 and the second component 212 are located relative to one another such that an inter-component gap 218 is formed between the brazing surface 214 of the first component 210 and the brazing surface 216 of the second component 212. As shown, the inter-component gap 218 is slanted slightly upward as it extends away from the central axis B-B, giving the inter-component gap 218 a frusto-conical shape.

Although not shown, the inter-component gap 218 may be formed by placing spacers between the first component 210 and the second component 212 to separate the two components or by using the locating joints described above. The use of locating joints have advantages over using standard spacers. The locating joint halves allow the first component 210 and the second component 212 to self-locate relative to one another. Additionally, the use of locating joints reduces the likelihood of disturbing the positioning of the components by mishandling.

Regardless of the spacing used, the distance between the brazing surfaces 214 and 216 is preferably relatively consistent across the portions of the inter-component gap 218 that will be brazed together. As will be described in further detail later, the distance between the brazing surfaces 214 and 216 should be appropriately chosen for the brazing material to ensure that both surfaces are wetted by the brazing material and that capillary action of the liquid braze material can occur between the brazing surfaces of 214 and 216.

About the periphery of the brazing surfaces 214 and 216, flow control features are formed. For example, on the first component 210, a lip 220 is formed near the outer periphery of the inter-component gap 218, where the inter-component gap widens. On the second component 212, a moat 222 is formed proximate the inner periphery of the inter-component gap 218. During the brazing process, these flow control features will direct and restrict the flow of the braze material across the inter-component gap 218.

Although in the form shown in FIGS. 6A and 6B, the flow control features include a lip on one component and a moat on the other, each brazing surface may have more than one flow control feature and each periphery of the inter component gap could have more than one flow control feature. The flow control features can include, but are not limited to, lips, dams, fillets, chamfers, moats, and the like.

During the brazing operation, the brazing surfaces 214 and 216 will be brazed together to form a brazed joint between the first component 210 and the second component 212. A charge of a brazing material 224 is positioned proximate the inter-component gap 218. The brazing material 224 is heated to at least a melting point of the brazing material 224, but a temperature below the melting point of the first and second components 210 and 212. The melted brazing material 224 will flow into the inter-component gap 218 between the brazing surface 214 of the first component 210 and the brazing surface 216 of the second component 212. The brazing material 224 will wet the brazing surfaces 214, 216 and fill the inter-component gap 218 via capillary action.

The flow control features shown in FIGS. 6A and 6B assist in directing and restricting the flow of the brazing material 224 in liquid form. In the configuration shown in FIGS. 6A and 6B, the charge of the brazing material 224 melts and flows into the moat 222 around the inner periphery of the inter-component gap 218. The moat 222 directs the brazing material 224 around the circumference of the inner periphery. When the moat 222 is filled with brazing material 224, the brazing material 224 begins to flow into the inter-component gap 218 wetting both of the surfaces and moving upward and away from the central axis B-B via capillary action. Once the brazing material 224 reaches the outer periphery of the inter-component gap 218, the lip 220 locally increases the spacing between the first component 210 and the second component 212.

Because the capillary action is at least partially dependent on the spacing between the brazing surfaces 214 and 216 and the contact angle between the liquid phase and the solid walls, when the spacing between the brazing surfaces 214 and 216 is increased, the brazing material 224 is not wicked past the lip 220. Specifically, the surface tension of the meniscus of the brazing material 224 is sufficiently great to prevent the brazing material 224 from flowing past the lip 220 (given the inter-component gap and the change in the contact angle at the flow control feature). This prevents the loss of brazing material 224 as the result of spilling over the side of the second component 212 and helps to ensure that none of the brazing material 224 is lost. If brazing material 224 is lost over the edge, then there may be insufficient brazing material 224 available to fill the inter-component gap 218 and form the brazing joint over the desired area of the inter-component gap 218.

As described above, in its liquid phase, the brazing material 224 will dissolve a thin layer of each of the brazing surfaces 214, 216. Upon cooling, the brazing material 224 will solidify, joining the first component 210 and the second component 212 at a brazed joint.

FIGS. 6A and 6B show one embodiment of the present invention. In subsequently described embodiments, like elements will be denoted by like numbers from FIGS. 6A and 6B with an added leading numeral to indicate the same general feature in the additional embodiment. The description of the above elements is applicable to the elements described below unless otherwise indicated.

Referring now to FIGS. 7A and 7B, another form of the present invention is shown. In this embodiment, the inter-component gap 318 includes a first ledge 326 and a second ledge 328 separated by a step 330. If non-axial shear stress is applied between the first component 310 and the second component 312, then the step 330 may provide a surface perpendicular to the applied force to reduce the shear stress load applied on the surfaces parallel to the applied force. It should be appreciated that a step could be also be formed between the first component 310 and the second component 312 such that when a torsional force is applied about the axis C-C, inducing tangential shear stresses in the brazed joint, at least a portion of the brazed joint is formed to be outside of a surface of highest shear stress.

Figure 7C:
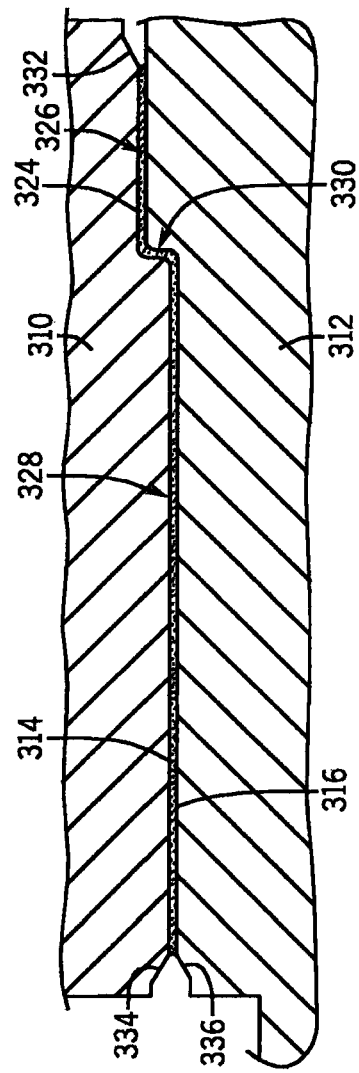
FIG. 7C is a detailed cross-sectional side view of FIG. 7A after the brazing material has melted to braze the two components together.

The flow control features at the inner periphery and the outer periphery of the inter-component gap 318 also differ from the embodiment previously shown. The first component 310 has a lip 332 along the inner periphery (that being the periphery closest to the axis C-C). The lip 332 allows for brazing material 324 to be directed into the inter-component gap 318. Along the outer periphery, the first component 310 has a lip 334 and the second component 312 has a lip 336. The separation of the lips 334 and 336 again provides a local increase in the spacing between the first component 310 and the second component 312 that inhibits the flow of the brazing material 324 past the outer periphery of the inter-component gap 318. Thus, the brazing material 324 is substantially retained between the components 310 and 312 to form the brazed joint. This is shown in FIG. 7C, which displays the brazed part after the brazing material 324 has flowed between the brazed surfaces 314 and 316 and solidified to braze the components 310, 312 together.

Figure 8:
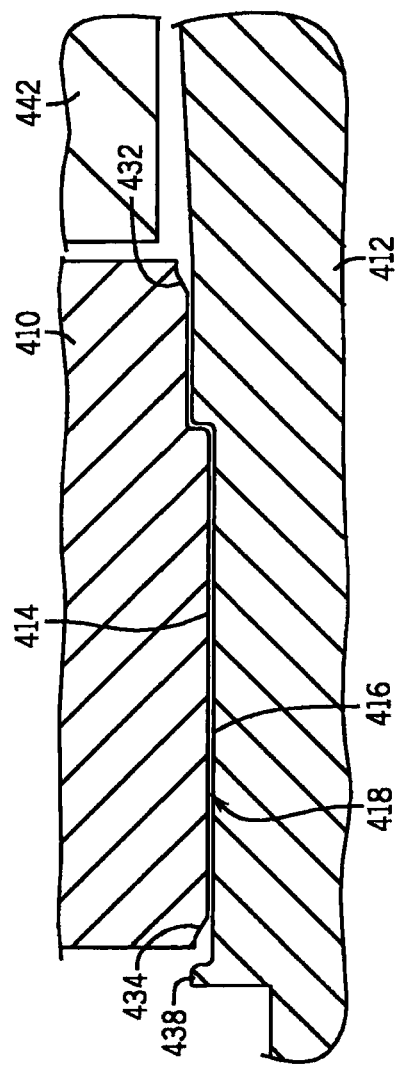
FIG. 8 is a detailed cross-sectional side view of two components similar to FIGS. 7A-7C, but with one of the components having a dam instead of a lip on the outer periphery of the inter-component gap.

Referring now to FIG. 8, a component configuration between brazed surfaces 414, 416 is shown that is similar to the component configuration in FIGS. 7A and 7B, but with slightly modified flow control features formed on the outer periphery of the inter-component gap 418. In particular, the second component 412 has a dam 438 formed on the outer periphery that inhibits the flow of the brazing material 424 from the inter-component gap 418 past the dam 438. The dam 438 is a portion of the second component 412 that is vertically raised to prevent the flow of the brazing material 424 away from the location of the brazed joint. In the form shown, the top of the dam 438 is as high as any other part of the inter-component gap 418, such that no brazing material 424 will be lost over the top of the dam 438 unless the inter-component gap 418 is entirely full of brazing material 224.

The dam 438 may or may not be coupled with other flow control features. For example, in the embodiment shown in FIG. 8, the dam 438 is used in conjunction with the lip 434 on the first component 410. The lip 434 inhibits the flow of brazing material 424 about the outer periphery of the inter-component gap 418, while the dam 438 provides additional protection against the loss of brazing material 424. However, it is contemplated that the dam could be also used without a lip nearby.

Figure 9:
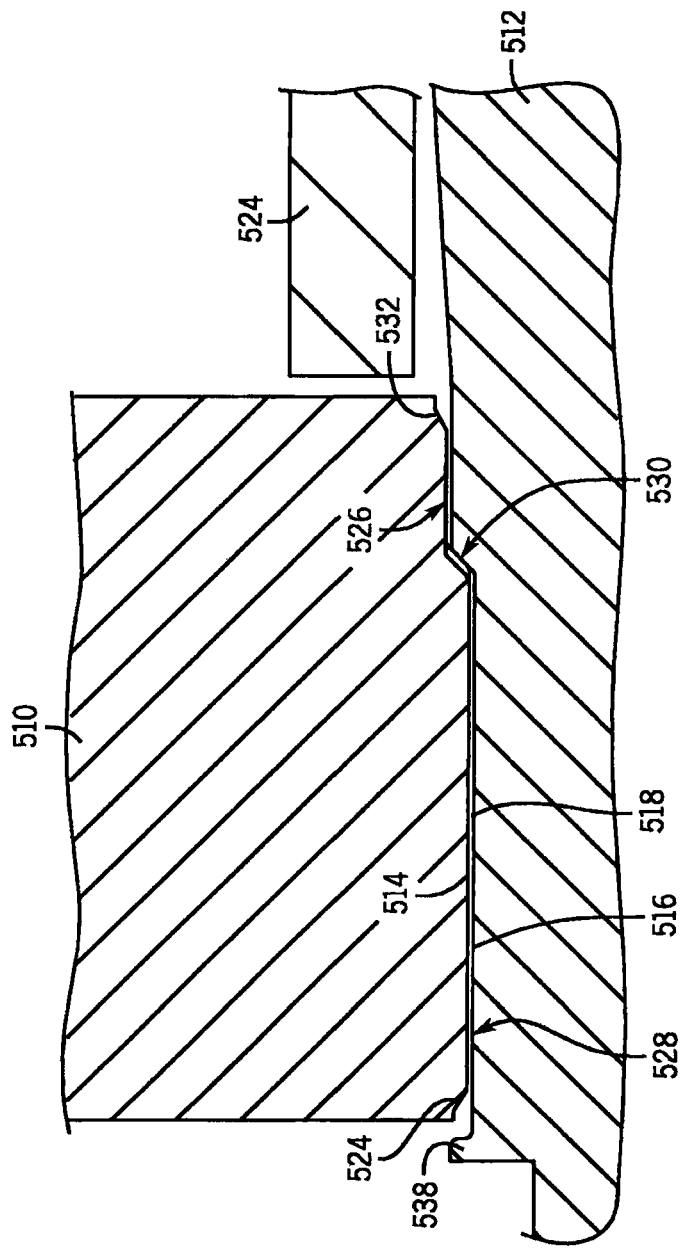
FIG. 9 is a detailed cross-sectional side view of two components similar to FIG. 8, but with an angled step formed in the inter-component gap.

Referring now to FIG. 9, yet another form of the present invention is shown in which the step 530 is at a slightly inclined angle instead of perpendicular to the first ledge 526 and the second ledge 528 as in the configuration shown in FIG. 8. When inter-component gaps like these intersect at an angle, whether it be a right angle or some other angle, when a torsional force is transmitted through the joint, shear stresses are induced over all of the gaps in which the braze joint material joins the components. Thus, it may be desirable to configure the gaps in this way to distribute the stresses.

Figure 10A:
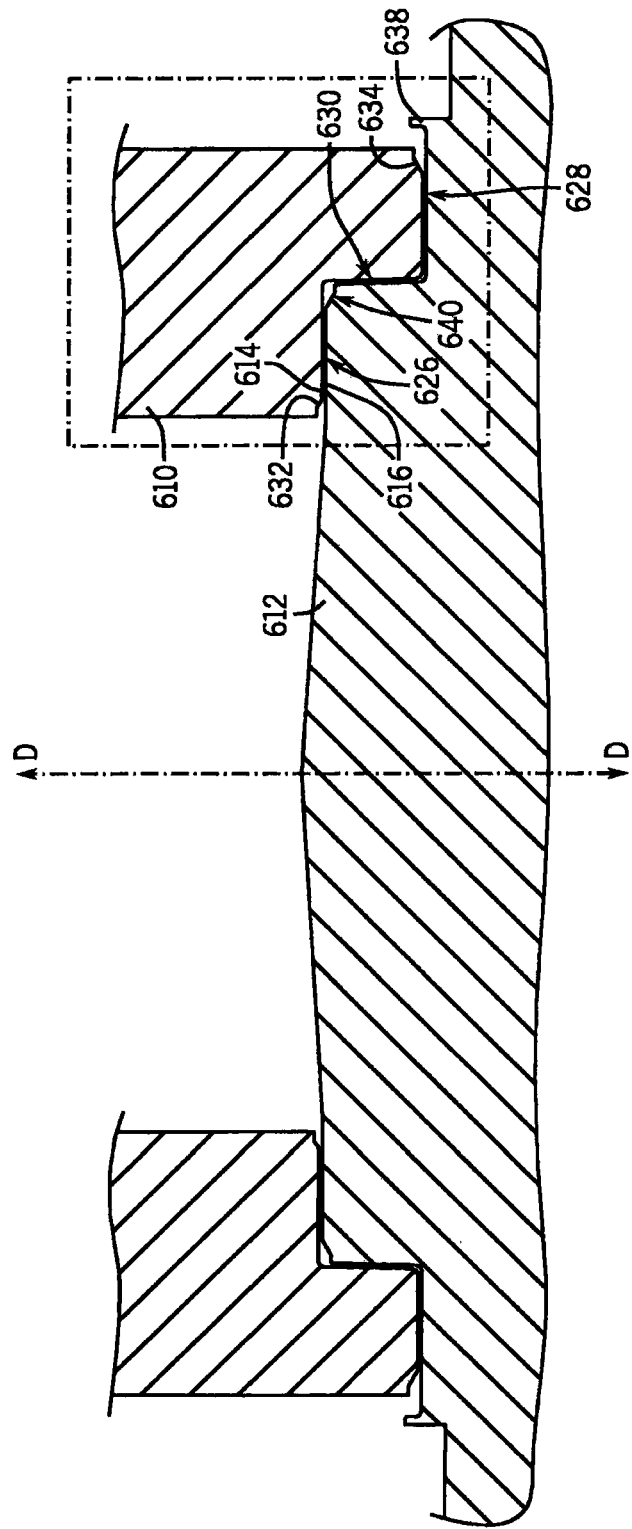
FIG. 10A is a cross-sectional side view of two components arranged next to one another prior to brazing, the two components having a large step formed in the inter-component gap with a lip formed thereabout.

Referring now to FIGS. 10A and 10B, an embodiment is shown in which the step 630 is longer. Further, there is a lip 640 along the inter-component gap 618 at the intersection between the first ledge 626 and the step 630, which creates a widening at the intersection of these surfaces. The lengthening of the step 630 may be desirable as the increased length increases the distribution area over which a shear stress is applied when the first component 610 is axially twisted relative to the second component 612.

Additionally, the lip 640 between the first ledge 626 and the step 630 serves the function of preventing all the material located on the first ledge 626 from flowing over the dam 638. As the first ledge 626 is elevated well above the dam 638, there will be a tendency for any braze material to want to flow from the first ledge 626, down the step 630, across the second ledge 628 and up and over the dam 638 due to gravity. Although the lip 634 proximate the dam 638 tends to form a meniscus that provides sufficient surface tension to prevent the brazing material from flowing past the lip 634, if there is enough elevated brazing material, then the meniscus may not be sufficiently strong to retain the brazing material in all portions of the inter-component gap 618. Thus, the lip 640 between the first ledge 626 and the step 630 may be used to help isolate the brazing material on the first ledge 626 from the brazing material in the step 630 and the second ledge 628 to retain all of the brazing material in the inter-component gap 618.

Thus, the flow control features described herein help to retain the brazing material within the inter-component gap during the brazing process. This reduces the likelihood of overflow occurring, creating a condition in which there is not enough brazing material to fill the gap. This further allows for the production of brazed joints having somewhat more complex geometries without the loss of braze material. By altering the geometry of the brazed joint, the total area over which certain types of stresses are applied is increased. This results in an overall strengthening of the brazed joint.

Many modifications and variations to these preferred embodiments will be apparent to those skilled in the art, which will be within the spirit and scope of the invention. Therefore, the invention should not be limited to the described embodiments. To ascertain the full scope of the invention, the following claims should be referenced.

What is claimed is:

1. A brazed part including a first component and a second component brazed together by a brazing material, the brazed part comprising:
    a plurality of locating joints, each of the plurality of locating joints including:
        a projection on one of the first component and the second component; and
        a corresponding recess on the other of the first component and the second component;
        wherein, in each of the plurality of locating joints, the projection is located in the corresponding recess to define an inter-component gap between the first component and the second component, in which inter-component gap is received a brazing material that brazes the first component and the second component together, the inter-component gap being sized so as to facilitate transport of a liquid phase of the brazing material therethrough via capillary action; and
    at least one lip disposed on at least one of the first component and the second component at a periphery of the inter-component gap, the lip providing a gradual increase of the inter-component gap at the periphery;
    a flow control feature formed between a first section and a second section of the inter-component gap, the first section and the second section not being in the same plane, the flow control feature being an internal lip that reduces a capillary force of the brazing material proximate the internal lip to inhibit the flow of the brazing material from the first section to the second section of the inter-component gap during brazing;
    wherein, during brazing, the gradual increase of the inter-component gap at the periphery produces a meniscus in the liquid phase of the brazing material having a surface tension sufficient to retain the brazing material in the inter-component gap for solidification.

2. The brazed part of claim 1, wherein, in each of the plurality of locating joints, the projection has an arcuate convex surface and the corresponding recess has opposite-facing angled walls and wherein, in each of the plurality of locating joints, the projection is located in the corresponding recess and is supported by contact between the arcuate convex surface and at least one of the angled walls.

3. The brazed part of claim 2, wherein the arcuate convex surface is semi-spherical and each of the angled walls contacted by the arcuate convex surface is essentially planar.

4. The brazed part of claim 1, wherein the first component and the second component are joined together via brazing at their respective brazing surfaces and wherein, during brazing, the brazing material is heated to form a liquid that flows through the inter-component gap to wet the brazing surfaces and join the brazing surfaces upon solidification.

5. The brazed part of claim 1, wherein the at least one lip inhibits the capillary action of the brazing material past the periphery of the inter-component gap during brazing.

6. The brazed part of claim 1, further comprising a dam that is vertically raised from the brazing surface of at least one of the first component and the second component and wherein the dam inhibits the flow of the brazing material past the dam to further substantially retain the brazing material within the inter-component gap.

7. The brazed part of claim 1, wherein, when the brazed part is subjected to a rotational stress about an axis resulting in an applied shear stress between the first and second components, at least one of the first section and second section extend along an essentially axial direction to increase an area over which the shear stress is applied.

8. The brazed part of claim 1, wherein the brazed part is a planetary gear carrier such that the first component is a cage having at least three legs and the second component is a plate and wherein a locating joint is located between each of the at least three legs and the plate to define at least three inter-component gaps between the cage and the plate.

9. The brazed part of claim 1, wherein the at least one lip on at least one of the first component and the second component at the periphery of the inter-component gap includes a lip on the first component at the periphery of the inter-component gap and a lip on the second component at the periphery of the inter-component gap.

10. The brazed part of claim 9, wherein the lip on the first component and the lip on the second component separate from one another to provide a local increase in spacing between the first component and the second component that inhibits the flow of the brazing material past the outer periphery of the inter-component gap.

11. A method of forming a brazed part, the method comprising:
    locating a first component relative to a second component by mating a plurality of locating joint portions of the first component with a plurality of locating joint portions of the second component to form a plurality of locating joints, each of the plurality of locating joints including a projection on one of the first component and the second component and a corresponding recess on the other of the first component and the second component, the first component being positioned relative to the second component such that a brazing surface of the first component and a brazing surface of the second component define an inter-component gap therebetween;

introducing a brazing material into the inter-component gap;

heating the brazing material to at least a melting point of the brazing material to form a liquid that flows through the inter-component gap toward a periphery of the inter-component gap by wetting the brazing surfaces of the first component and the second component;

substantially retaining the brazing material within the inter-component gap by use of at least one lip disposed on at least one of the first component and the second component at a periphery of the inter-component gap, the at least one lip providing a gradual increase of the inter-component gap at the periphery that, upon receiving a flow of the liquid of the brazing material, produces a meniscus in the liquid of the brazing material having a surface tension that retains the brazing material in the inter-component gap for solidification; and solidifying the brazing material to form a brazed joint between the first component and the second component;

wherein a flow control feature is formed between a first section and a second section of the inter-component gap, the first section and the second section not being in the same plane, the flow control feature being an internal lip that reduces a capillary force of the brazing material proximate the internal lip to inhibit the flow of the brazing material from the first section to the second section of the inter-component gap during brazing.

12. The method of claim 11, wherein the first component and the second component each have at least three locating joint portions, each of the at least three locating joint portions being one of a projection with an arcuate convex surface and a recess with opposite-facing angled walls; and
wherein the step of locating the first component relative to the second component includes mating the at least three locating joint portions of the first component and the at least three locating joint portions of the second component to form at least three locating joints that define the inter-component gap, each of the at least three locating joints including a projection and a recess, such that the arcuate convex surface of the projection contacts at least one of the opposite-facing angled walls of the recess.

13. The method of claim 11, wherein the step of introducing the brazing material comprises placing the brazing material in a blind hole and wherein, during the step of heating the brazing material, the brazing material moves to and wets by capillary action at least a portion of the inter-component gap between the first component and the second component.

14. The method of claim 11, wherein the step of introducing the brazing material comprises placing the brazing material in the recess of the locating joint and wherein, during the step of heating the brazing material, the brazing material moves to and wets by capillary action at least a portion of the inter-component gap between the first component and the second component.

15. The method of claim 11, wherein the step of introducing the brazing material to at least one of the first component and the second component occurs before locating the first component relative to the second component, such that during the heating step, as the brazing material melts, a distance between the first component and the second component decreases and locates the first component relative to the second component by self-seating the locating joint portions of the first component into the locating joint portions of the second component to form the locating joints.

* * * * *